Patented May 24, 1927.

1,629,714

UNITED STATES PATENT OFFICE.

CHARLES E. KRAUS, OF BABYLON, NEW YORK.

CEMENT COMPOSITION.

No Drawing. Original application filed April 17, 1919, Serial No. 290,671. Divided and this application filed September 23, 1924. Serial No. 739,340.

It is well known that the plasticity of clays is regulated very largely by what is known in the ceramic art as "water of plasticity". This term designates the amount of water required to develop the maximum of plasticity. My invention has for its object to increase the plasticity of clay and other mineral substances having a limited degree of plasticity, or to impart plasticity to minerals which practically lack it, by adding thereto a certain proportion of fine grained minerals, having greater absorptive power for water than the clay or other material to be improved in plasticity, and containing a higher percentage of colloidal matter than such clay or other material.

This application is a division of my prior application Serial Number 290,671 filed April 17, 1919.

My invention may be used to increase the plasticity of kaolin, clay, bauxite, calcium carbonate, flint, shale, cement rock, asbestos, etc. Among the minerals suitable for use as plasticity-improving agents as referred to above, I will mention bentonite, ehrenbergite, damonterolite and montmorillonite. The superiority of these agents over clays as regards contents of colloidal matter will be understood better considering that bentonite contains from 85 to 95% of colloidal matter, and ehrenbergite from 70% up, whereas clay contains only from one-half to one per cent to one and a half per cent of colloidal matter. It is to be understood that the term colloidal matter as used herein means that matter which gives bentonite and similar substances their colloidal properties.

The bentonite or similar material is added to the clay or other substance to be improved in plasticity, either as a dry powder, or mixed with (suspended in) water, or with a viscous solution, such as a solution of alum or of silicate of soda, and by the use of such a viscous solution a gelatinous mass is obtained. The dry powdered material, or the mixture of such material with water, or the gelatinous mass mentioned above, is mixed thoroughly (in any suitable apparatus) with the clay or other substance to be improved. But instead of treating the clay or like substance in this manner, I may apply the treatment to any mixture in which clay or an analogous substance is used.

The percentage of bentonite or other equivalent material containing a very high percentage of colloidal matter added to the clay or other substance will vary according to the nature of the material and of the substance with which it is to be mixed. Thus if bentonite is used for improving the plasticity of clay, kaolin, or the like, from five to ten per cent of bentonite will be sufficient, unless very great plasticity is desired, in which case a higher proportion of bentonite will be employed. If a material less plastic than clay is to be improved, for instance bauxite, flint, calcium carbonate, etc., a greater percentage of the bentonite or other fine grained mineral substance will be required than when treating clay; say, from fifteen to twenty per cent of bentonite will be employed in this case instead of from five to ten per cent, for ordinary use, and more if very high plasticity is to be obtained.

The improvement in plasticity secured by the addition of the fine grained minerals referred to above, is probably due to the fact that they fill the voids between the particles of clay or the like, and cause the mass of clay, when dried, to become stronger and denser, thereby improving its bonding quality. This action is probably due to the very high percentage of colloidal matter contained in bentonite and similar materials, said percentage, as stated above, being from about forty-five to about two hundred times as high as it is for clay. Another advantage of my new treatment is that the clay, upon being fired, reaches the proper density at a lower temperature than heretofore, which is of value for certain classes of work.

I am aware of the well-known methods of increasing the plasticity of kaolin by the addition of gums, tannic acid, electrolytes, etc. All of these however have certain undesirable effects, which are avoided by the use of my invention. Thus, when an electrolyte is added, it has a tendency to float to the surface and to produce uneven results during firing since the surface of the clay body will in this case fuse more readily than its interior. The addition of gums impairs the burning density of the clay.

My invention improves the clay or other material as regards its raw strength, its bonding power, its density upon being fired, and its slacking qualities.

By my invention it is possible to increase the plasticity of kaolin to such an extent that ball clay may be eliminated in making bodies or glazes in the manufacture of pottery and similar wares, thereby improving such goods in color and translucency, as well as reducing the cost of manufacture.

Various modifications may be made without departing from the nature of my invention as defined in the appended claims.

While in some of the appended claims, bentonite is named as the plasticity-improving agent, I desire it to be understood that this covers equivalents, such as ehrenbergite or damonterolite.

What I claim is:

1. In the method for imparting plasticity and strength to cement rock, the step which consists of incorporating with said cement rock finely divided bentonite and liquid, thoroughly mixing the mass, and drying the mass.

2. In the method for imparting plasticity and strength to cement rock, the step which consists of incorporating with said cement rock finely divided bentonite, clay and liquid, thoroughly mixing the mass and drying the mass.

3. A plasticized composition containing cement rock, finely divided bentonite and liquid.

4. A plasticized composition containing cement rock, finely divided bentonite, clay and liquid.

In testimony whereof I have signed this specification this 18th day of October, 1925.

CHARLES E. KRAUS.